United States Patent [19]

von Plessen et al.

[11] Patent Number: 5,308,600
[45] Date of Patent: May 3, 1994

[54] PROCESS FOR CONDITIONING WASTE SULFURIC ACID

[75] Inventors: Helmold von Plessen, Königstein/Taunus; Wolfram Fritsche-Lang, Bensheim; Horst Lorke, Liederbach, all of Fed. Rep. of Germany

[73] Assignee: Hoechst Aktiengesellschaft, Frankfurt am Main, Fed. Rep. of Germany

[21] Appl. No.: 924,037

[22] PCT Filed: Feb. 22, 1991

[86] PCT No.: PCT/EP91/00329
§ 371 Date: Oct. 23, 1992
§ 102(e) Date: Oct. 23, 1992

[87] PCT Pub. No.: WO91/13828
PCT Pub. Date: Sep. 19, 1991

[30] Foreign Application Priority Data
Mar. 3, 1990 [DE] Fed. Rep. of Germany ....... 4006665

[51] Int. Cl.$^5$ ............................................. C01B 17/90

[52] U.S. Cl. .................................. 423/527; 423/522; 423/523; 423/525; 423/531; 423/DIG. 2; 423/265; 252/407; 208/13

[58] Field of Search ................ 423/DIG. 2, 523, 527, 423/DIG. 1, 531, 522, 525, 265; 208/351, 15, 13; 44/311, 434; 585/950; 252/407

[56] References Cited

U.S. PATENT DOCUMENTS

| | | | |
|---|---|---|---|
| 1,604,641 | 10/1926 | Halloran et al. | 208/13 |
| 2,198,686 | 4/1940 | Watson | 23/172 |
| 3,372,009 | 3/1968 | Waldmann | 44/72 |
| 3,980,450 | 9/1976 | Battersby | 44/72 |
| 4,409,000 | 10/1983 | LeSuer | 44/70 |

FOREIGN PATENT DOCUMENTS

| | | | |
|---|---|---|---|
| 0061193 | 9/1982 | European Pat. Off. | |
| 709595 | 8/1931 | France | |
| 52-5808 | 1/1977 | Japan | 208/13 |
| WO89/05279 | 6/1989 | PCT Int'l Appl. | |

Primary Examiner—Gary P. Straub
Assistant Examiner—Timothy C. Vanoy

[57] ABSTRACT

Process for conditioning waste sulfuric acid which is prone to precipitation of tars or resins, which comprises adding emulsifiers, preferably long-chain polyethers, to the waste sulfuric acid.

19 Claims, No Drawings

PROCESS FOR CONDITIONING WASTE SULFURIC ACID

DESCRIPTION

The present invention relates to a process for conditioning waste sulfuric acid, which is prone to precipitation of tars or resins, by means of emulsifiers.

In many chemical processes, a sulfuric acid laden with water, organic or inorganic materials, such as nitro compounds, sulfonic acids, mineral salts, nitric acid or hydrogen chloride, arises as a waste product. The content of such waste sulfuric acid fluctuates within wide limits. For example, it can arise as thin acid of 5 to 60% by weight of $H_2SO_4$ or as a waste acid of 60 to 80% by weight of $H_2SO_4$. A plurality of processes are known for concentrating such contaminated waste sulfuric acid by evaporation of the water content. The method, according to which the evaporation is carried out, depends as a rule on the content of the waste sulfuric acid. For example, waste acid of 60 to 80% by weight of $H_2SO_4$ can be concentrated by the Pauling process to give 95 to 96% by weight $H_2SO_4$. More highly diluted sulfuric acid can be evaporated in a circulation evaporator (Winnacker-Küchler, Chemische Technologie [Chemical Technology], volume 2 (1982), pages 61 to 71). Waste acid laden with organic materials can also be processed by thermal cracking, but this involves a very high energy consumption (loc. cit. pages 23 to 25).

Waste sulfuric acid must as a rule be transported or stored before or during processing. This is made considerably more difficult or even impossible if a solid or highly viscous phase separates out of the waste sulfuric acid. Thus, pipes can be blocked by precipitated resins or tars, or vessels can be filled up to such an extent that their functioning is greatly impeded. Other parts of the equipment for reprocessing, such as heat exchangers, can also be impaired in their functioning by deposits, in particular by resin or tar precipitates taken along in the waste sulfuric acid.

Such troublesome precipitates can in principle be separated off by filtration, but precisely resins or tars easily cause blockage of the filter apparatus (German Offenlegungsschrift 2,450,255). Moreover, renewed precipitation after a filtration is frequently observed.

Particularly in the nitration of reactive aromatics such as naphthalene or acenaphthene, varying quantities of resins are also frequently formed in addition to the desired nitro compounds (Houben-Weyl, Methoden der organ. Chemie [Methods of organic chemistry], 4th edition, volume 10/1 (1971), pages 492 and 496). The waste sulfuric acid thus obtained tends to secrete so-called nitration resins, whereby reprocessing is made much more difficult. Frequently, within only a few hours, such a large quantity of resin precipitates from the waste sulfuric acid that the pipes and vessels foul up. Nitration processes, such as are listed, for example, in Houben-Weyl, Methoden der organ. Chemie [Methods of organic chemistry], 4th edition, volume 10/1 (1971), page 663, likewise lead to such waste sulfuric acids which cause problems.

These so-called nitration resins can also arise as undesired by-products in nitrations in highly concentrated nitric acid (German Offenlegungsschrift 2,338,479) and cause deposits.

Admittedly, the deposits in the pipes, tanks or equipment items can as a rule be removed by washing with a solvent, but this represents an additional process step. Furthermore, the contaminated solvents thus arising must likewise also be reprocessed.

It is known to condition waste sulfuric acid by treatment with activated carbon, i.e. to render it stable for storage, transport and reprocessing. A disadvantage of this process is the high cost of procuring the fresh activated carbon and disposing of the spent activated carbon. Moreover, waste sulfuric acid treated in this way frequently deposits impurities again, even after a short time.

In addition, a number of processes for eliminating the impurities from the said waste sulfuric acids by treatment with oxidizing agents have been described (German Offenlegungsschrift 2,404,613 and German Offenlegungsschrift 2,450,255). However, these can be carried out only with considerable expenditure on equipment and chemicals. Moreover, problems can arise in all the piping or tanks, required for the acid transport or storage, through which the waste sulfuric acid must run before it reaches the oxidation reactor.

It was therefore the object to develop processes which allow even those waste sulfuric acids which are prone to precipitation of tars or resins to be stored, transported and reprocessed without any problems.

It has now been found that the object is achieved by the addition of emulsifiers to the waste sulfuric acid.

Accordingly, the present invention relates to a process for conditioning waste sulfuric acid, which is prone to precipitation of tars or resins, which comprises adding emulsifiers to the waste sulfuric acid. Advantageously, polyethers, especially polyglycol ethers, preferably with a long-chain radical, are used as the emulsifiers.

Polyglycol ethers bound to organic radicals, preferably those of the general formula $R^1O\text{-}(CHRCH_2O)_nH$ (I) in which:

R is H and/or lower alkyl, especially methyl, $R^1$ is a hydrocarbon radical having 8 to 26 carbon atoms, preferably alkyl or alkenyl having an average chain length of 8 to 22, especially of 12 to 14 or of 16 to 18, carbon atoms, such as oleyl, the latter range being particularly preferred; and also preferably ($C_6$–$C_{20}$) alkylphenyl such as nonylphenyl, or dior tri-alkaylphenyl, the chain length of the alkyl groups being 6 to 20 carbon atoms in total, especially di- or tri-butylphenyl, and n is an integer from 2 to 50, preferably from 5 to 20, particularly preferably 5 to 10, are particularly suitable for the process according to the invention.

Compounds of the general formula

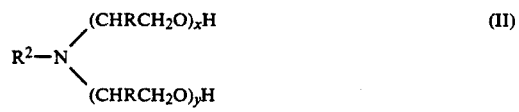

in which R is as defined above, $R^2$ is a hydrocarbon radical having 8 to 26 carbon atoms, preferably alkyl or alkenyl having an average chain length of 8 to 22, preferably 12 to 14 or 16 to 18, carbon atoms, the latter range being particularly preferred, and the total of x and y is 4 to 50, preferably 5 to 40 and particularly preferably 5 to 25, are preferred in the same way.

Mixtures of emulsifiers, especially those of the above-mentioned structures, are also suitable.

For the process according to the invention, the emulsifiers, preferably polyglycol ethers as such or dissolved in water, are added in an inorganic or organic solvent, such as nitrobenzene, or in a mineral acid, such as sulfuric acid, to the waste sulfuric acid. The addition can be made in tanks which are provided with stirrers, or in other mixing devices. The mixing step is preferably carried out at temperatures from 0° to 30° C. The process according to the invention is suitable in principle for waste sulfuric acids of any possible $H_2SO_4$ content. The required quantity of emulsifier depends on the degree of loading of the waste sulfuric acid, and on the time for which stability of the particular waste sulfuric acid during transport or storage is to be achieved. This is in general 1 to 8 days. The longer the standing times and the higher the ambient temperatures during transport or storage, the greater as a rule the quantity of added emulsifier must be. In general, this quantity is about 0.01 to about 3% by weight, preferably about 0.05 to about 2% by weight, particularly preferably about 0.1 to about 1% by weight, relative to the weight of the waste sulfuric acid used.

In some cases, the emulsifier can cause foaming of the waste sulfuric acid during further processing, for example during the evaporation. This foaming can be prevented, according to German Offenlegungsschrift 2,656,236 or 2,653,088, by addition of suitable sulfonic acids or nitro compounds. The foam can also be eliminated by means of alkylsulfonamides.

EXAMPLES

The storage stability of 35 % by weight waste sulfuric acid from the production of nitrotoluidine (designated as Type 1 sulfuric acid in the table which follows) at various temperatures in the presence of an emulsifier is shown in Examples 5 and 6.

In addition, the stability of acid mixtures of the said Type 1 sulfuric acid with an unloaded pure 65% by weight sulfuric acid (Type 2) or with a 60% by weight waste sulfuric acid from the production of alkanesulfonate (Type 3) at room temperature (22° C.) in the presence of an emulsifier was investigated (Examples 7 to 9, 11, 12 and 14). The emulsifiers used were:
oleyl-aminoethoxylate, $x+y=5$ (Type A emulsifier),
oleyl-aminoethoxylate, $x+y=15$ (Type B) and
oleyl-ethoxylate, $n=8$ (Type C) and also
nonylphenyl polyglycol ether, $n=10$ (Type D).

Comparison Examples 1 to 4, 10 and 13 show the nature of a Type 1 waste sulfuric acid and that of mixtures of this acid with Type 2 or 3 sulfuric acid in the absence of an emulsifier, after various standing times have elapsed. In Comparison Example 13, the Type 1 sulfuric acid was pretreated with activated carbon.

| | Sulfuric acid | | Emulsifier | | | State of the samples after a standing time of | | | | |
|---|---|---|---|---|---|---|---|---|---|---|
| Example | Type | Mixing ratio (vol./vol.) | Type | Quantity [g] per 100 g of acid mixture | Temp. °C. | 1 day | 3 days | 6–7 days | 9–10 days | 15–16 days |
| 1* | 1 | | | | 0 | d, f | d, f | e, f | e, f | e, f |
| 2* | 1 | | | | 22 | e, f | e, f | e, f | e, f | e, f |
| 3* | 1 + 2 | 1:1 | | | 0 | a | a | a | a | a |
| 4* | 1 + 2 | 1:1 | | | 22 | a | b | d | e, f | e, f |
| 5 | 1 | | A | 0.8 | 0 | b | b | c | c, f | c, f |
| 6 | 1 | | A | 1.6 | 22 | a | b | b | b | b |
| 7 | 1 + 2 | 1:1 | B | 0.18 | 22 | a | a | | d | d |
| 8 | 1 + 2 | 1:1 | B | 0.35 | 22 | a | a | | a | c |
| 9 | 1 + 2 | 1:1 | C | 0.35 | 22 | a | a | | d | d |
| 10* | 1 + 3 | 1:1 | | | 22 | b | d | e, f | e, f | e, f |
| 11 | 1 + 3 | 1:1 | B | 0.18 | 22 | c | | c | 12 days: d | d, f |
| 12 | 1 + 3 | 1:1 | B | 0.36 | 22 | b | | b | 12 days: c | d |
| 13* | 1 | | activated carbon | 1.1 | 0 | b | e | e | e, f | e, f |
| 14 | 1 + 2 | 1:1 | D | 0.35 | 22 | a | a | | | a |

*Comparison example
a clear
b trace of turbidity
c noticeable turbidity
d turbid
e very turbid
f precipitations

EXAMPLE 15

1 l of a 37.6% by weight waste sulfuric acid from the production of nitrotoluidine was mixed with 1 l of a 65% by weight sulfuric acid. After the addition of 5 g (0.18% by weight) of oleyl-aminoethoxylate ($x+y=15$), the mixture was left to stand for 2 days at 22° C. 250 ml of this acid mixture (C: 0.8%; N: 0.3%) were then filled into a distillation apparatus and heated to the boil with stirring. During the following distillation, taking 3.5 hours, 1.5 l of the acid mixture were continuously fed to the distillation apparatus. After the end of this time, 635 g of an aqueous distillate (C: 1.3 %; N: 0.03 %), which also contained 2.2 % by weight of $H_2SO_4$, had collected. It was necessary only during the first 25 minutes of the distillation process, during which time 130 ml of acid mixture in total were fed in, to add 15.8 g of Bayer 7800 neu ® antifoam in the form of a 33% by weight aqueous emulsion, in order to eliminate the foam.

After completion of the distillation, 1874 g of a 68.3 % by weight slightly turbid sulfuric acid (C: 0.7 %; N: 0.11 %; same figures after filtration) of black-brown color remained in the bottom. This reconcentrated acid thus obtained proved to be stable on storage. Firmly adhering precipitations did not occur either on the walls of the distillation apparatus or on those of the storage container.

We claim:

1. A process for conditioning waste sulfuric acid, which is prone to precipitation of tars or resins, which comprises adding a polyether as an emulsifier to the waste sulfuric acid.

2. The process as claimed in claim 1, wherein the waste sulfuric acid to be conditioned is waste sulfuric acid from a nitration process.

3. The process as claimed in claim 1, wherein a polyglycol ether is used as the emulsifier.

4. The process as claimed in claim 1, wherein the polyether added is a compound of the formula $R^1O\text{—}(CHRCH_2O)_nH$, in which R is H and/or lower alkyl, and $R^1$ is alkyl or alkenyl having an average chain length of 8 to 22 carbon atoms, alkylphenyl with the alkyl group having a chain length of 6 to 20 carbon atoms, or di-or tri-alkylphenyl with the alkyl groups having a chain length of 6 to 20 carbon atoms in total, and n is a number from 2 to 50.

5. The process as claimed in claim 1, wherein the polyether added is a compound of the formula

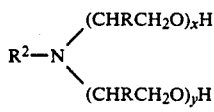

in which R is H and/or lower alkyl, $R^2$ is alkyl or alkenyl having an average chain length of 8 to 22 carbon atoms, and the total of x and y is 4 to 50.

6. The process as claimed in claim 1, wherein the quantity of polyether is 0.01 to 3% by weight, relative to the weight of the waste sulfuric acid.

7. The process as claimed in claim 6, wherein said waste sulfuric acid has been obtained from a nitration process.

8. The process as claimed in claim 6, wherein the quantity of polyether added is 0.05 to 2% by weight, relative to the weight of the waste sulfuric acid.

9. The process as claimed in claim 2, wherein said nitration process involves the nitration of an aromatic compound.

10. The process as claimed in claim 1, wherein the waste sulfuric acid contains water and said tars or resins, and the amount of polyether added is an amount that is sufficient to emulsify said tars or resins for a period of transportation or storage lasting at least one day.

11. The process as claimed in claim 10, wherein said waste sulfuric acid has been obtained from a nitration process.

12. The process as claimed in claim 1, wherein said polyether has one or a plurality of polyether chains, each polyether chain having a plurality of repeating units, the total number of ether groups in said polyether ranging from 4 to 50.

13. The process as claimed in claim 1, wherein said polyether is:

a compound of the formula $R^1O\text{—}(CHRCH_2O)_nH$    I in which R is H or lower alkyl or a combination thereof, $R^1$ is alkyl or alkenyl having an average chain length of 8 to 22 carbon atoms, alkylphenyl with the alkyl group having chain lengths of 6 to 20 carbon atoms, or di- or tri-alkylphenyl with the alkyl groups having chain lengths totaling 6 to 20 carbon atoms, and n is a number from 2 to 50, or a compound of the formula

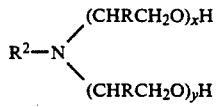   II in which

R is H or lower alkyl or a combination thereof, $R^2$ is alkyl or alkenyl having an average chain length of 8 to 22 carbon atoms, and the total of x and y is 4 to 50, or a combination of compounds of the formulas I and II.

14. The process as claimed in claim 13, wherein said waste sulfuric acid has been obtained from a nitration process.

15. The process as claimed in claim 13, wherein R is H or methyl or a combination of H and methyl; $R^1$ is alkyl or alkenyl having an average chain length of 12 to 14 or 16 to 18 carbon atoms, and n is a number from 5 to 20.

16. The process as claimed in claim 13, wherein R is H or methyl or a combination of H and methyl; $R^2$ is alkyl or alkenyl having an average chain length of 12 to 14 or 16 to 18, and the total of x and y is 5 to 40.

17. The process as claimed in claim 13, wherein the quantity of polyether added is 0.01 to 3% by weight, relative to the weight of the waste sulfuric acid.

18. A process for conditioning waste sulfuric acid, comprising:

adding, to a waste sulfuric acid containing 5 to 80% by weight $H_2SO_4$, water, and tars or resins prone to precipitation, a tar- or resin-emulsifying amount of a polyether having one or a plurality of oxyalkylene chains, each oxylkylene chain having a plurality of repeating ether units, the total number of ether units in said polyether ranging from 4 to 50, said emulsifying amount being sufficient to prevent precipitation of tars or resins for a period of transportation or storage of at least one day.

19. The process as claimed in claim 18, comprising the steps of:

adding 0.01 to 3% by weight, relative to the weight of the waste sulfuric acid, of at least one said polyether, the amount added depending upon the composition of the waste sulfuric acid and the period of transportation or storage, and recovering stabilized sulfuric acid of lessened water content.

* * * * *